United States Patent
Liu et al.

(10) Patent No.: US 8,977,004 B2
(45) Date of Patent: Mar. 10, 2015

(54) METHODS AND SYSTEMS FOR VASCULAR PATTERN LOCALIZATION USING TEMPORAL FEATURES

(71) Applicant: Xerox Corporation, Norwalk, CT (US)

(72) Inventors: Yi Liu, Cambridge, MA (US); Beilei Xu, Penfield, NY (US); Robert P Loce, Webster, NY (US); Wencheng Wu, Webster, NY (US); Lalit K Mestha, Fairport, NY (US); Edgar A Bernal, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 164 days.

(21) Appl. No.: 13/710,974

(22) Filed: Dec. 11, 2012

(65) Prior Publication Data

US 2014/0161307 A1 Jun. 12, 2014

(51) Int. Cl.
  *G06K 9/00* (2006.01)
  *G06K 9/32* (2006.01)
  *H04N 5/225* (2006.01)

(52) U.S. Cl.
  CPC .................................. *G06K 9/3241* (2013.01)
  USPC ........................................ 382/103; 348/169

(58) Field of Classification Search
  CPC .................................................... G06K 9/00
  USPC .......... 382/103, 236; 348/154, 155, 369–172, 348/352
  See application file for complete search history.

(56) References Cited

U.S. PATENT DOCUMENTS

| | | | |
|---|---|---|---|
| 6,993,170 B2 * | 1/2006 | Johnson et al. | 382/128 |
| 8,781,193 B2 * | 7/2014 | Steinberg et al. | 382/130 |
| 2012/0263357 A1 * | 10/2012 | Xu et al. | 382/128 |

OTHER PUBLICATIONS

Eliza Strickland, "The Biometric Wallet", IEEE Spectrum Biomedical Imaging, Jun. 2012, pp. 1-3, http://spectrum.ieee.org/biomedical/imaging/the-biometric-wallet, accessed Dec. 19, 2012.
S. Crisan et al, "Vein pattern recognition. Image enhancement and feature extraction algorithms", 15th IMEKO TC4 Symposium, Ia Iași, i, Romania, 2007, ISBN 978-973-667-260-6, pp. 1-5, http://home.mit.bme.hu/~kollar/IMEKO-procfiles-for-web/tc4/TC4-15th-Iasi-2007/Final_Papers/F060.pdf, accessed Dec. 19, 2012.
M.Z. Poh et al., "Non-contact, automated cardiac pulse measurements using video imaging and blind source separation", Optics Express, vol. 18, No. 10, pp. 10762-10774, 2010, pp. 1-13, http://www.opticsinfobase.org/oe/fulltext.cfm?uri=oe-18-10-10762&id=199381, accessed Dec. 19, 2012.
D. Ross et al., "Adaptive Probabilistic Visual Tracking with Incremental Subspace Update", in A. Heyden et al., editors, Proceedings of the Eighth European Conference on Computer Vision, LNCS 2350, pp. 707-720, Springer Verlag, 2004.
L. Wang et al., "Near- and far- infrared imaging for vein pattern biometrics", Proceedings of IEEE AVSS, 2006, pp. 1-6.

(Continued)

*Primary Examiner* — Abolfazl Tabatabai
(74) *Attorney, Agent, or Firm* — MH2 Technology Law Group LLP (57) ABSTRACT

A system and method of localizing vascular patterns by receiving frames from a video camera, identifying and tracking an object within the frames, determining temporal features associated with the object; and localizing vascular patterns from the frames based on the temporal features associated with the object.

18 Claims, 5 Drawing Sheets

(56) References Cited

OTHER PUBLICATIONS

L.J. Cao et al., "Feature selection for support vector machines in financial time series forecasting", Intelligent Data Engineering and Automated Learning: Data Mining, Financial Engineering, and Intelligent Agents, Second International Conference Proceedings, Springer-Verlag, Dec. 2000, pp. 1-19.

Mestha et al., "Processing a Video for Vascular Pattern Detection and Cardiac Function Analysis", U.S. Appl. No. 13/483,992, pp. 1-40, filed May 30, 2012.

Mestha et al., "Estimating Cardiac Pulse Recovery From Multi-Channel Source Data Via Constrained Source Separation", U.S. Appl. No. 13/247,683, pp. 1-45, filed Sep. 28, 2011.

Kyal et al., "Continuous Cardiac Pulse Rate Estimation From Multi-Channel Source Video Data", U.S. Appl. No. 13/528,307, pp. 1-54, filed Jun. 20, 2012.

* cited by examiner

METHODS AND SYSTEMS FOR VASCULAR PATTERN LOCALIZATION USING TEMPORAL FEATURES

TECHNICAL FIELD

The present disclosure relates generally to methods, systems, and computer readable media for vascular pattern localization using temporal features of moving image media.

BACKGROUND

Vascular pattern localization is an analysis of blood vessels patterns beneath the surface of skin, and is a useful tool with a variety of commercial and medical applications. For example, vascular pattern recognition can he used as a technique for biometric identification. However, visibility of vascular patterns in the visible spectrum varies from person to person, and for many people the contrast between vascular and nonvascular regions may be too low for detection in the visible spectrum from still images.

Conversely, near infrared (NIR) imaging produces images with high image contrast between vascular and nonvascular regions. However, NIR imaging requires special illumination sources and specialized NIR cameras that are generally more expensive than visible spectrum cameras.

Accordingly, vascular pattern localization technologies may be improved by techniques for localizing vascular patterns that do not require specialized equipment and lighting.

SUMMARY OF THE INVENTION

The present disclosure relates generally to methods, systems, and computer readable media for providing these and other improvements to vascular pattern localization and recognition.

In some embodiments, a computing device can identify an object to track on a person from multiple video image frames. For example, the computing device can identify the back of a hand from multiple video image frames.

The computing device can track and analyze pixel information within the object, such as color intensity levels and statistics thereof, throughout the multiple video image frames. The computing device can extract temporal features from the tracked pixel information. For example, variance, standard deviations, ranges, and percent of ranges of pixel information from a fixed location on the object throughout the multiple video image frames, averages of the pixel information throughout the multiple video image frames, the frequency components of the pixel information from a fixed location on the object throughout the multiple video image frames, the correlations of a sequence of pixel information throughout the multiple video image frames to known time series, or combinations thereof can be extracted.

The computing device can localize vascular patterns by analyzing temporal features from the tracked pixel information. For example, the computing device can apply image segmentation techniques, such as thresholding or clustering, to create a representation of the vascular patterns with increased contrast between pixels.

Finally, in some embodiments, the computing device can apply morphological filtering techniques to the representation of the vascular patterns to preserve, for example, connectivity of vascular patterns and remove non-connected components.

BRIEF DESCRIPTION OF THE DRAWING

The accompanying drawings, which are incorporated in and constitute a part of this specification, illustrate various embodiments of the present disclosure and together, with the description, serve to explain the principles of the present disclosure. In the drawings.

DETAILED DESCRIPTION

The following detailed description refers to the accompanying drawings. Wherever possible, the same reference numbers are used in the drawings and the following description to refer to the same or similar parts. While several exemplary embodiments and features of the present disclosure are described herein, modifications, adaptations, and other implementations are possible, without departing from the spirit and scope of the present disclosure. Accordingly, the following detailed description does not limit the present disclosure. Instead, the proper scope of the disclosure is defined by the appended claims.

Figure 1A:
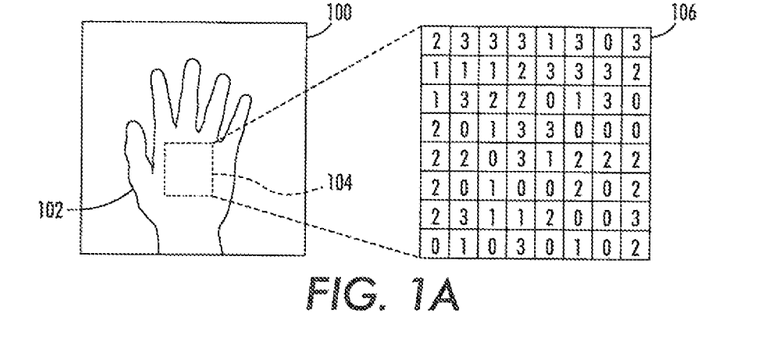
FIG. 1A is a diagram depicting an exemplary image from a first image frame of a video and a first exemplary pixel analysis, consistent with certain disclosed embodiments.

FIG. 1A is a diagram depicting an exemplary image from a first image frame of a video and a first exemplary pixel analysis, consistent with certain disclosed embodiments. As depicted in FIG. 1A, image frame 100 represents a still image frame of a video at a first time (e.g., 0.1 seconds into the video) depicting a back of a hand 102, and grid 106 represents a simplified eight-by-eight grid of pixel color intensity values extracted from a region of interest 104 identified on the back of band 102.

Figure 1B:
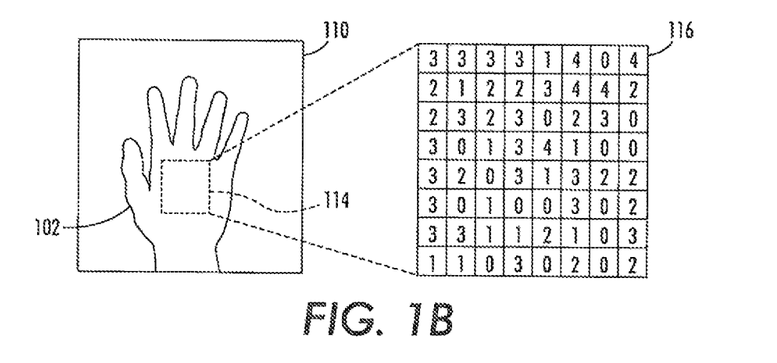
FIG. 1B is a diagram depicting an exemplary image from a second image frame of the video and a second exemplary pixel analysis, consistent with certain disclosed embodiments.

FIG. 1B is a diagram depicting an exemplary image from a second image frame of a video and a second exemplary pixel analysis, consistent with certain disclosed embodiments. As depicted in FIG. 1B, image frame 110 represents a still image frame of a video at a second time (e.g., 0.2 seconds into the video) depicting the back of hand 102, and grid 116 represents a simplified eight-by-eight grid of pixel color intensity values extracted from a region of interest 114 identified on the back of hand 102.

Notably, certain values in grid 106 differ from values in grid 116, while other values are equivalent. For example, each pixel color intensity value in the first column of grid 106 is not equal to the counterpart pixel color intensity value in the first column of grid 116. Additionally, each pixel color intensity value in the second column of grid 106 is equal to the counterpart pixel color intensity value in the second column of grid 106.

Figure 1C:
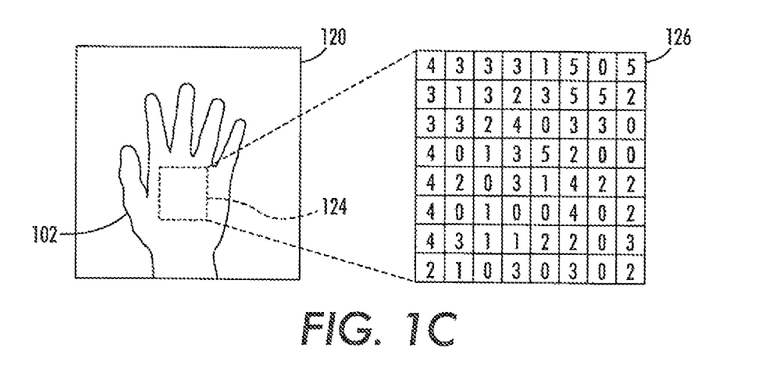
FIG. 1C is a diagram depicting an exemplary image from a third image frame of the video and a third exemplary pixel analysis, consistent with certain disclosed embodiments.

FIG. 1C is a diagram depicting an exemplary image from a third image frame of a video and a third exemplary pixel analysis, consistent with certain disclosed embodiments. As depicted in FIG. 1C, image frame 120 represents a still image frame of a video at a third time (e.g., 0.3 seconds into the video) depicting the back of hand 102, and grid 126 represents a simplified eight-by-eight grid of pixel color intensity values extracted from a region of interest 124 identified on the back of hand 102. It is to be noted that regions of interest 104, 114, and 124 correspond to a same physical region (which means the pixel locations may be different if the hand is moving, but still correspond to the same physical region after application of object tracking). In FIGS. 1A-1C regions of interest 104, 114, and 124 are labeled with different numbers to represent the same instance of a physical region at different times.

Notably, certain values in grid 126 differ from values in grid 116 and grid 106, while other values are equivalent. For example, each pixel color intensity value in the first column of grid 126 is not equal to the counterpart pixel color intensity value in the first column of grid 116 and the pixel color intensity value in the first column of grid 106. Additionally, each pixel color intensity value in the second column of grid 126 is equal to the counterpart pixel color intensity value in the second column of grid 116 and the second column of grid 106.

FIGS. 1A-1C depict a simplified example of a scene captured using a visible spectrum and/or RUB video camera or imaging device. Image frames 100, 110, and 120 represent a series of image frames which may or may not be consecutive.

The color intensity values illustrated in grids 106, 116, and 126 can represent color intensity values of, for example, red, green, blue channels or a combination thereof, and can represent different colors or different shades of the same color. The color intensity values are not intended to depict actual color intensity levels extracted using the disclosed techniques, but are simplified values for the purpose of illustration.

Figure 1D:
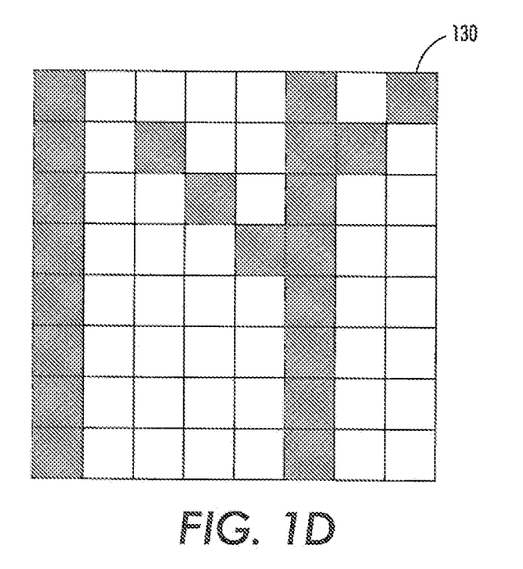
FIG. 1D is a diagram depicting an exemplary binarized image created by analyzing temporal features of a video image frame sequence, consistent with certain disclosed embodiments.

FIG. 1D is a diagram depicting an exemplary binarized image created by analyzing temporal features, consistent with certain disclosed embodiments. In embodiments, each grid block in binarized image 130 can represent a pixel from regions of interest 104, 114, and 124, and can correspond to a pixel on grids 106, 116, and 126.

In some implementations, a computing device can track each pixel in grids 106, 116, and 126, and analyze temporal features of each pixel as the image frames progress from the first time to the third time. For instance, the computing device can determine that the color intensity values in the first columns of grids 106, 116, and 126 vary from the first time to the third time, while the color intensity values in the second column of grids 106, 116, and 126 remain constant. The computing device can assign binary values to grid blocks in binarized image 130, a first binary value if the value varied from the first time to the third time and a second binary value if the color intensity value did not vary from the first time to the third time. Accordingly, binarized image 130 can be created from grids 106, 116, and 126.

FIGS. 1A-1D represent an example under ideal conditions for the purpose of illustration, where there are clear differences between pixels with varying temporal features and pixels with consistent temporal features. However, in many embodiments, captured video will likely include image noise, such as, but not limited to, changes in lighting, poor video quality, and movement of the video camera. Such image noise would prevent the ideal conditions presented in the above illustration. Accordingly, in some embodiments, the computing device can determine that the temporal features of a first set of pixels from a region of interest vary by amount over a threshold across a sequence of image frames, while the temporal features of a second set of pixels do not vary by amount over a threshold across the sequence of image frames. Based on such a determination, the computing device can assign binary values to grid blocks in binarized image 130, a first binary value to the first set of pixels and a second binary value to the second set of pixels. Accordingly, binarized image 130 can be created even under non-ideal, real-world conditions.

Figure 1E:
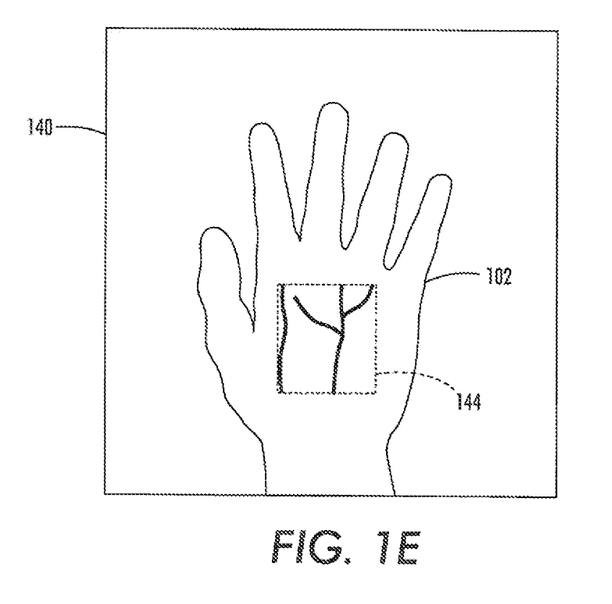
FIG. 1E is a diagram depicting a localized vascular pattern projected onto an image captured from the video, consistent with certain disclosed embodiments.

FIG. 1F is a diagram depicting a localized vascular pattern projected onto an image captured from a video, consistent with certain disclosed embodiments. As depicted in FIG. 1E, region of interest 144 displays a final vascular pattern that may be localized using image frames 100, 110, and 120, and based on binarized image 130. In embodiments, a computing device can localize patterns from binarized image 130 and apply morphological filtering to preserve connectivity of any localized patterns and remove non-connected components.

Accordingly, even small changes in color, shade, or color intensity can be detected from a video, and capturing of temporal features can allow for the detection of vascular patterns previously difficult to detect using still images. Further, variations in color, color shade, or color intensity can be detected from video captured using specialized equipment, such as NIR video cameras, Short Wave Infrared (SWIR) video cameras, and thermographic video cameras, as well as cheap and commonplace equipment, such as RGB video cameras.

Figure 2A:
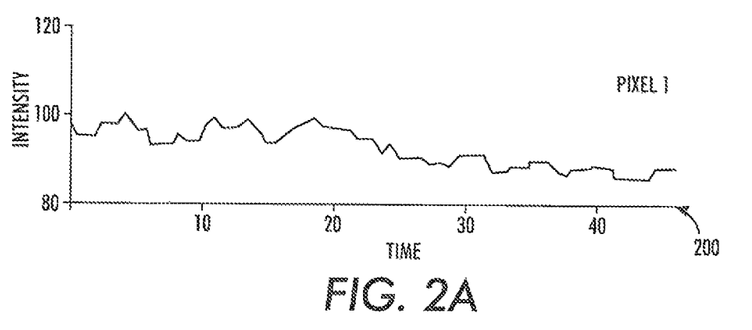
FIG. 2A is a diagram depicting a series of color intensities for a first pixel, consistent with certain disclosed embodiments.

FIG. 2A is a diagram depicting a series of color intensities for a first pixel, consistent with certain disclosed embodiments. In embodiments, a y-axis of graph 200 can represent a color intensity level of the first pixel, and an x-axis of graph 200 can represent time. As depicted in FIG. 2A, the color intensity level varies over time for the first pixel.

The first pixel may, for example, represent a small section of a person's skin, such as the back of hand 102 depicted in FIGS. 1A-1C and 1E. The changes in color intensity as time progresses may indicate changes such as, but not limited to, lighting, shadow, camera focus, exposure or white balance, blood volume changes in a vascular pathway, etc. Changes in color intensity due to lighting, shadow, camera focus, exposure or white balance usually have different temporal signature from blood volume changes in vascular pathways. However, without comparison to other pixels, color intensity levels alone may not indicate whether the first pixel represents a vascular or a nonvascular region.

Figure 2B:
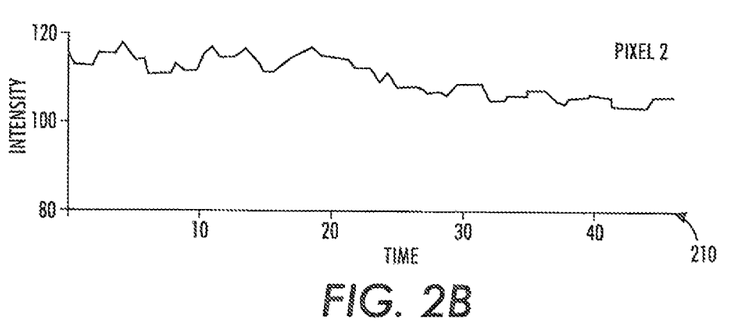
FIG. 2B is a diagram depicting a series of color intensities for a second pixel, consistent with certain disclosed embodiments.

FIG. 2B is a diagram depicting a series of color intensities for a second pixel, consistent with certain disclosed embodiments. In embodiments, a y-axis of graph 210 can represent a color intensity level of the second pixel, and an x-axis of graph 210 can represent time. As depicted in FIG, 2B, the color intensity level varies over time for the second pixel. Further, the pattern of color intensity levels for graph 210 is similar to the pattern of the color intensity levels in graph 200, but the color intensity levels are higher for graph 210.

In embodiments, the first pixel and the second pixel may belong to the same region of a video image frame, such as the video represented by image frames 100, 110, and 120 in FIGS. 1A-1C. In further embodiments, the first pixel and the second pixel may be in close proximity or even adjacent to one another.

The first pixel and the second pixel may, for example, represent two small sections of a person's skin, such as the back of hand 102 depicted in FIGS. 1A-1C and 1E. The changes in color intensity as time progresses may indicate changes such as, but not limited to, lighting, shadow, camera focus, exposure or white balance, blood volume changes in a vascular pathway, etc. However, because the patterns are similar, the variation in color intensities may not indicate whether one pixel represents a vascular or a nonvascular region.

Figure 2C:
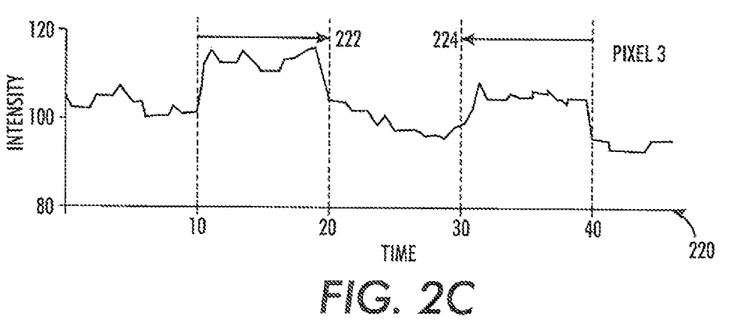
FIG. 2C is a diagram depicting a series of color intensities for a third pixel, consistent with certain disclosed embodiments.

FIG. 2C is a diagram depicting a series of color intensities for a third pixel, consistent with certain disclosed embodiments. In embodiments, a y-axis of graph 220 can represent a color intensity level of the third pixel, and an x-axis of graph 220 can represent time. As depicted in FIG. 2C, the color intensity level varies over time for the third pixel. Further, the pattern of color intensity levels for graph 220 includes dissimilarities from graph 200 and graph 210. For example, graph section 222 (between time 10 and time 20) depicts a rise in variation that is not depicted in graph 200 or graph 210. Graph section 224 (between time 30 and time 40) depicts a similar feature.

In embodiments, the first pixel, the second pixel, and the third pixel may belong to the same region of a video image frame, such as the video represented by image frames 100, 110, and 120 in FIGS. 1A-1C. In further embodiments, the first pixel, the second pixel, and the third pixel may be in close proximity or even adjacent to one another.

The first pixel, the second pixel, and the third pixel may, for example, represent three small sections of a person's skin, such as the back of hand 102 depicted in FIGS. 1A-1C and 1E. The changes in color intensity as time progresses may indicate changes such as, but not limited to, lighting, shadow, camera focus, exposure or white balance, blood volume changes in a vascular pathway, etc. However, because the color intensity levels of the third pixel vary in a manner that is distinct from the first pixel and the second pixel, a computing device may be able to determine that the third pixel represents a vascular region and the first and second pixels represent nonvascular regions.

In some embodiments, the color intensity level represented on the y-axis of graphs 200, 210, and 220 can represent the color intensity level of a specific color channel, such as the red channel or the green channel. Additionally, in further embodiments, the color intensity level represented on the y-axis of graphs 200, 210, and 220 can represent the color intensity level of different color channels combined or concatenated into, for example, a single series across specific time intervals.

In further implementations, the time represented on the x-axis of graphs 200, 210, and 220 can be in seconds, fractions of a second, or any other unit of time. Additional embodiments may track sequential image frames instead of time.

Further, the above description refers to pixels for simplicity of illustration, but embodiments are not limited to units of a pixel, and a pixel, as used herein, may represent an element of an image, such as single pixel, a part of a pixel, multiple pixels, etc.

FIGS. 2A-2C depicts simplified examples of color intensity graphs. The different color intensity values illustrated in graphs 200, 210, and 220 are for the purposes of illustration and are not intended to be limiting. Further, the color intensity values are not intended to depict actual color intensity levels extracted using the disclosed techniques, but are simplified values for the purpose of illustration.

Figure 3:
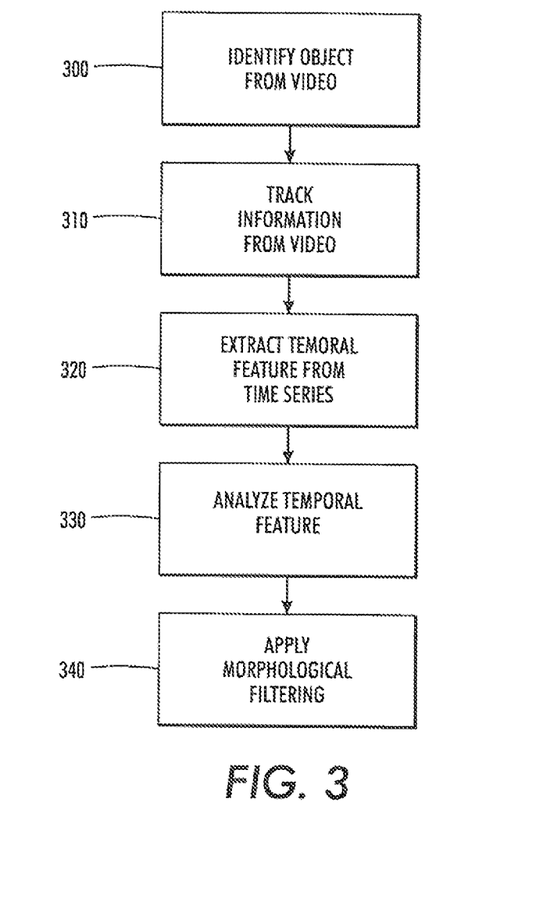
FIG. 3 is a flow diagram illustrating an exemplary method of implementing a vascular pattern localization technique, consistent with certain disclosed embodiments.

FIG. 3 is a flow diagram illustrating an exemplary method of implementing a vascular pattern localization technique, consistent with certain disclosed embodiments. The process can begin after a computing device receives one or more image frames from a video. For example, the computing device can receive the image frames from an attached visible spectrum video camera.

In 300, the computing device can identify one or more objects for tracking from the video. As used herein, an object is a person's body, or a part thereof that includes vascular regions, captured in a video that includes exposed vascular regions. For example, an exposed hand could be identified as an object in an image frame by color, shape, or location relative to other identified sections of a body or scene. In some embodiments, multiple objects can be identified, including objects from multiple people captured in the video.

Once an object is identified, the computing device can track the object using methods know in the art, such as visual tracking, boundary tracking, etc.

In some embodiments, a region of interest containing the identified object can be extracted from one or more image frames of the video. Utilization of the region of interest can allow for a faster processing and tracking of the selected object compared to processing and tracking of the selected object in the complete image frame.

Additionally or alternatively, the computing device can spatially downsample the image frame and/or the region of interest to Rather improve computation efficiency and processing and reduce image acquisition noise. For example, a 9:1 downsampling rate can be used on a region of interest within the video.

In 310, the computing device can track information from images of the identified object within the image frame or region of interest. In embodiments, the tracked information can be information contained within pixels across the duration of the video.

For example, a pixel can contain three temporal signals throughout an RGB video. Each signal can correspond to each of the red, green, and blue channels. The computing device can track color intensity levels of each signal across the video.

As an additional example, in some embodiments, the three signals can be tracked and then the signals can be combined together across specific time intervals, resulting in a single temporal signal for each pixel.

In 320, the computing device can extract temporal features from the tracked information from 310. For example, the computing device can extract a representative temporal feature from the tracked information, such as variance of the color intensity levels for tracked pixels. In embodiments, higher variance in color intensity levels for one pixel throughout the video in comparison to other pixels could indicate the pixel covers a vascular region, while lower variance levels could indicate the pixel covers a nonvascular region. Alternatively or additionally, temporal features such as, but not limited to, color intensity level averages, standard deviations, frequency components, correlations to known time series, ranges, and percent of ranges can be determined and used for distinguishing vascular regions from nonvascular regions.

In 330, the computing device can analyze and process the temporal features extracted in 320. For example, the computing device can apply thresholding, including adaptive or static thresholding techniques, to create high-contrast images, such as binarized or grayscaled images (e.g. binarized image 130 from FIG. 1D). For example, the computing device can assign binary pixel labels to pixel locations depending on threshold levels and variance levels calculated in 320. Pixel locations that have a variance level above the threshold levels can receive a first binary pixel label, while pixel locations that have a variance level below the threshold levels can receive a second binary pixel label. In further embodiments, a grayscale image can be created by assigning grayscale pixel labels to pixel locations proportionally based on, for example, variance levels and/or averages calculated in 320.

Because high variance levels compared to other pixels may indicate vascular regions rather than nonvascular regions, the created binarized or grayscale image may begin to show vascular pathways captured in the video.

In some embodiments, static thresholding may not be sufficient to identify vascular regions due to different depths of vascular pathways, non-uniform illumination, color skin variation, etc. in such embodiments, dynamic and/or adaptive thresholding techniques could be utilized to create the high contrast images. For example, different spatial groups of pixels can utilize different thresholding values.

Additionally or alternatively, the computing device can apply classification and/or clustering techniques to the extracted temporal features to identify pixels that likely depict vascular regions and pixels that likely depict nonvascular regions.

In 340, morphological filtering can be applied to the images created in 330. Morphological filtering can preserve the connectivity of localized vascular patterns identified in 330 and remove non-connected objects. After such morphological filtering, a final vascular pattern can be identified and localized.

While the steps depicted in FIG. 3 have been described as performed in a particular order, the order described is merely exemplary, and various different sequences of steps can be performed, consistent with certain disclosed embodiments. Further, the steps described are not intended to be an exhaustive or absolute, and various steps can be inserted or removed. For example, in some embodiments, the computing device may not apply morphological filtering to vascular patterns localized in 330. Additional variations of steps can be utilized, consistent with certain disclosed embodiments.

Figure 4:
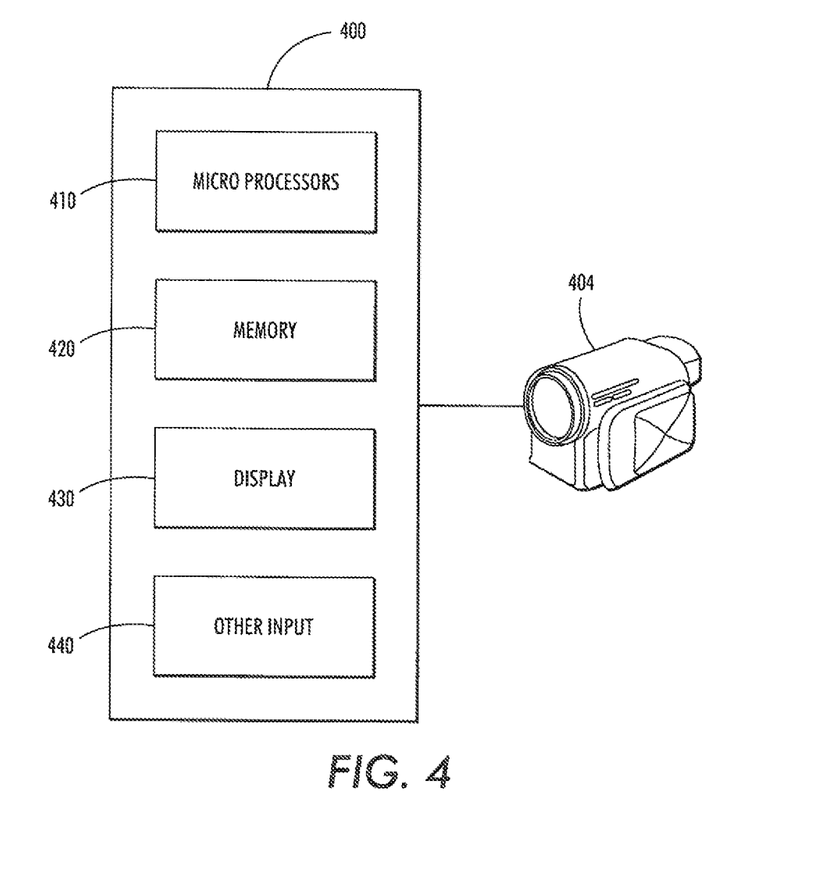
FIG. 4 is a diagram depicting an exemplary computing device that may utilize vascular pattern localization technologies, consistent with certain disclosed embodiments.

FIG. 4 is a diagram depicting an exemplary computing device that may utilize vascular pattern localization technologies, consistent with certain disclosed embodiments. Computing device 400 may represent any type of one or more computing devices able to receive input from video camera 404. For example, computing device 400 may represent a personal computer, a cellular phone, a tablet computer, or a laptop. Additionally, in some embodiments, video camera 404 can be integrated with computing device 400.

Video camera 404 can represent any type of image capturing device capable of sending a sequence of captured images to computing device 400. In embodiments, video camera 404 can represent a specialized or high quality camera, such as, for example, a high-definition camera or a camera capable of capturing images in non-visible spectrums, such as infrared or near infrared spectrums. In further embodiments, video camera 404 can represent standard and/or non-specialized cameras such as, for example, visible spectrum cameras, and/or cameras integrated into devices such as cellular phones, tablet computers, laptops, etc.

Computing device 400 may include, for example, one or more microprocessors 410 of varying core configurations and clock frequencies; one or more memory devices or computer-readable media 420 of varying physical dimensions and storage capacities, such as flash drives, hard drives, random access memory, etc., for storing data, such as images, files, and program instructions for execution by one or more microprocessors 410; one or more transmitters for communicating over network protocols, such as Ethernet, code divisional multiple access (CDMA), time division multiple access (TDMA), etc. Components 410 and 420 may be part of a single device as disclosed in FIG. 4 or may be contained within multiple devices. Those skilled in the art will appreciate that the above-described componentry is exemplary only, as device 400 may comprise any type of hardware componentry, including any necessary accompanying firmware or software, for performing the disclosed embodiments.

Furthermore, computing device 400 can, in embodiments, include a display 430 as an integrated or non-integrated component. Computing device 400 can additionally include other input devices 440 that are integrated with the device or capable of sending information to the device. Such input devices can include, but are not limited to, a mouse, a keyboard, and a microphone.

The foregoing description of the present disclosure, along with its associated embodiments, has been presented for purposes of illustration only. It is not exhaustive and does not limit the present disclosure to the precise form disclosed. Those skilled in the art will appreciate from the foregoing description that modifications and variations are possible in light of the above teachings or may be acquired from practicing the disclosed embodiments. The steps described need not be performed in the same sequence discussed or with the same degree of separation. Likewise, various steps may be omitted, repeated, or combined, as necessary, to achieve the same or similar objectives or enhancements. Accordingly, the present disclosure is not limited to the above-described embodiments, but instead is defined by the appended claims in light of their full scope of equivalents.

What is claimed is:

1. A method of localizing a vascular pattern in image data, the method comprising:
  receiving a plurality of image frames from a video camera;
  identifying and tracking an object within the plurality of image frames;
  determining one or more temporal features associated with the object; and
  determining a location of a vascular pattern from the plurality of image frames based on the one or more temporal features associated with the object, using one or more processors, wherein determining the location of the vascular pattern from the plurality of image frames based on the one or more temporal features associated with the object comprises extracting a representative temporal feature from the one or more temporal features and deriving binary pixel labels based on the representative temporal feature.

2. The method of claim 1, further comprising extracting a region of interest from the plurality of image frames, wherein the region of interest comprises the object.

3. The method of claim 1, further comprising downsampling the plurality of image frames.

4. The method of claim 1, wherein determining the location of the vascular pattern from the plurality of image frames based on the one or more temporal features associated with the object comprises applying morphological filtering to the vascular pattern.

5. The method of claim 1, wherein the video camera is one or more of a visible spectrum video camera, a SWIR video camera, a NIR video camera, and a thermographic video camera.

6. The method of claim 5, wherein the one or more temporal features associated with the object comprise color intensity values for one or more color channels.

7. The method of claim 6, wherein the one or more temporal features associated with the object comprise color intensity values for a plurality of color channels and the color intensity values for the plurality of color channels are combined into a single series.

8. The method of claim 1, wherein the representative temporal feature is one or more of variance of color intensity values of one or more color channels from the plurality of image frames, average of color intensity values of one or more color channels from the plurality of image frames, frequency components of color intensity values of one or more channels from the plurality of image frames, and correlation of color intensity values from the plurality of image frames to a known time series.

9. The method of claim 1, wherein deriving binary pixel labels based on the representative temporal feature comprises applying one or more of thresholding, classification techniques, and clustering techniques.

10. A system configured to extract vascular patterns, the system comprising:
a processing system comprising one or more processors; and
a memory system comprising one or more computer-readable media, wherein the one or more computer-readable media contain instructions that, when executed by the processing system, cause the processing system to perform operations comprising:
receiving a plurality of image frames from a video camera;
identifying and tracking an object within the plurality of image frames;
determining one or more temporal features associated with the object; and
determining a location of a vascular pattern from the plurality of image frames based on the one or more temporal features associated with the object, using one or more processors, wherein determining the location of the vascular pattern from the plurality of image frames based on the one or more temporal features associated with the object comprises extracting a representative temporal feature from the one or more temporal features and deriving binary pixel labels based on the representative temporal feature.

11. The system of claim 10, the operations further comprising extracting a region of interest from the plurality of image frames, wherein the region of interest comprises the object.

12. The system of claim 10, the operations further comprising downsampling the plurality of image frames.

13. The system of claim 10, wherein determining the location of the vascular pattern from the plurality of image frames based on the one or more temporal features associated with the object comprises applying morphological filtering to the vascular pattern.

14. The system of claim 10, wherein the video camera is one or more of a visible spectrum video camera, a SWIR video camera, a NIR video camera, and a thermographic video camera.

15. The system of claim 14, wherein the one or more temporal features associated with the object comprise color intensity values for one or more color channels.

16. The system of claim 15, wherein the one or more temporal features associated with the object comprise color intensity values for a plurality of color channels and the color intensity values for the plurality of color channels are combined into a single series.

17. The system of claim 10, wherein the representative temporal feature is one or more of variance of color intensity values of one or more color channels from the plurality of image frames, average of color intensity values of one or more color channels from the plurality of image frames, frequency components of color intensity values of one or more channels from the plurality of image frames, and correlation of color intensity values from the plurality of image frames to a known time series.

18. The system of claim 10, wherein deriving binary pixel labels based on the representative temporal feature comprises applying one or more of thresholding, classification techniques, and clustering techniques.

* * * * *